(12) United States Patent
Takeshita et al.

(10) Patent No.: US 6,510,119 B2
(45) Date of Patent: Jan. 21, 2003

(54) OPTICAL HEAD DEVICE

(75) Inventors: Nobuo Takeshita; Mitsuru Irie; Toru Yoshihara, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/727,521

(22) Filed: Dec. 4, 2000

(65) Prior Publication Data

US 2002/0009040 A1 Jan. 24, 2002

(30) Foreign Application Priority Data

Jul. 18, 2000 (JP) .......................................... 12-216815

(51) Int. Cl.$^7$ .............................................. G11B 7/135
(52) U.S. Cl. .............................. 369/112.28; 369/112.14; 369/44.37; 369/44.23
(58) Field of Search .......................... 369/44.12, 44.14, 369/44.23, 44.28, 44.37, 47.1, 53.1, 53.28, 112.01, 112.11, 112.23, 112.27, 116, 112.21, 112.14, 112.28

(56) References Cited

U.S. PATENT DOCUMENTS

| | | | |
|---|---|---|---|
| 4,942,584 A | | 7/1990 | Karaki et al. |
| 6,163,409 A | * | 12/2000 | Uchiyama et al. .......... 359/634 |
| 6,272,098 B1 | * | 8/2001 | Takahashi et al. ..... 369/112.17 |

FOREIGN PATENT DOCUMENTS

| | | |
|---|---|---|
| JP | 10-112056 | 4/1998 |
| JP | 11-296893 | 10/1999 |

OTHER PUBLICATIONS

"Hoya Optical Glass Technical Data, BSC7, 517–642".

* cited by examiner

Primary Examiner—Muhammad Edun
(74) Attorney, Agent, or Firm—Birch, Stewart, Kolasch & Birch, LLP

(57) ABSTRACT

A light source (1) is composed of a single element having a light emitting point (2S) emitting a light (3S) and a light emitting point (2L) emitting a light (3L) at a longer wavelength than the light (3S), the light emitting point (2S) and the light emitting point (2L) being formed monolithically. In the direction parallel to the optical axis of a collimator lens (6), the light emitting point (2S) is placed closer, than the light emitting point (2L), to the collimator lens (6) and is placed on the side of the inclined plane (7a) of the beam shaping prism (7). The incidence angles of the light (3S) and the light (3L) to the inclined plane (7a) are set so that the incidence angle of the light (3S) is larger than that of the light (3L) and so that the lights (3S) and (3L) exit from the inclined plane (7a) at equal exit angles. The collimator lens (6), the beam shaping prism (7), etc. have refractive indexes which become larger as the wavelength of incident light becomes shorter. It is then possible to simplify the structure and reduce the unstableness of operation caused by a difference in light wavelength.

6 Claims, 9 Drawing Sheets

F I G . 2
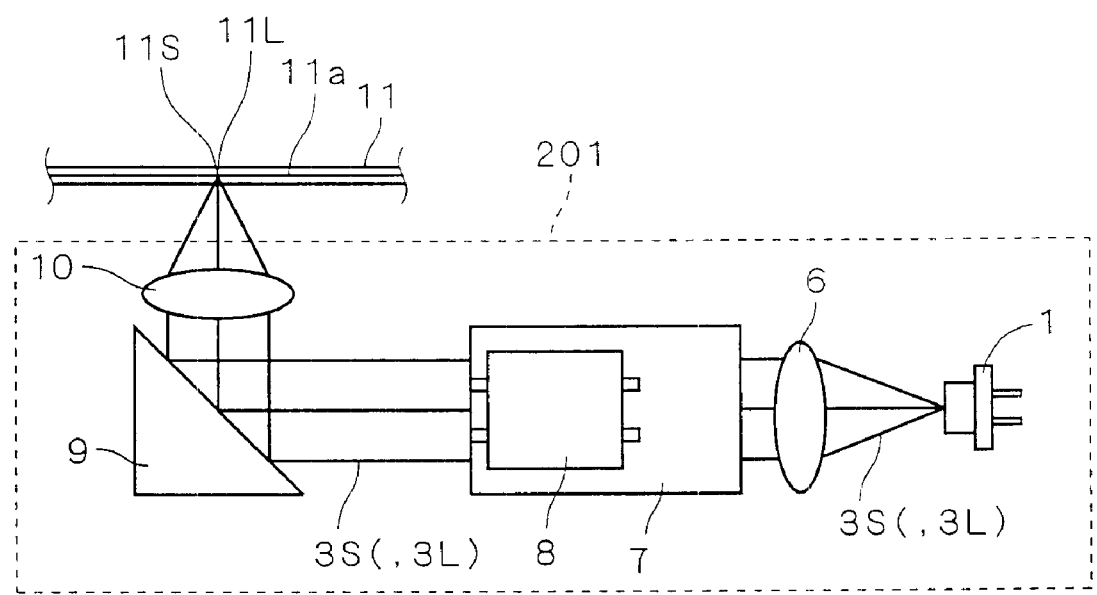

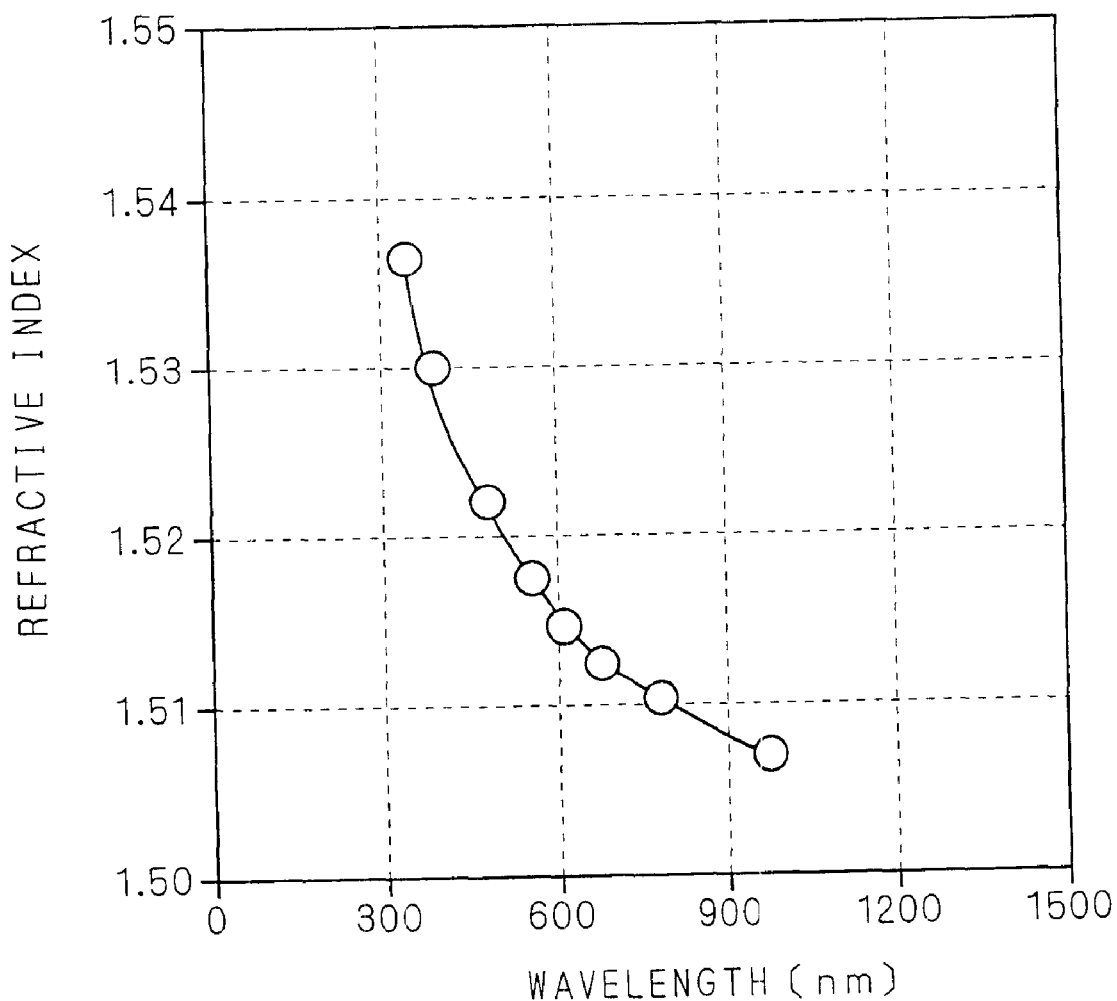
F I G . 6

F I G . 7
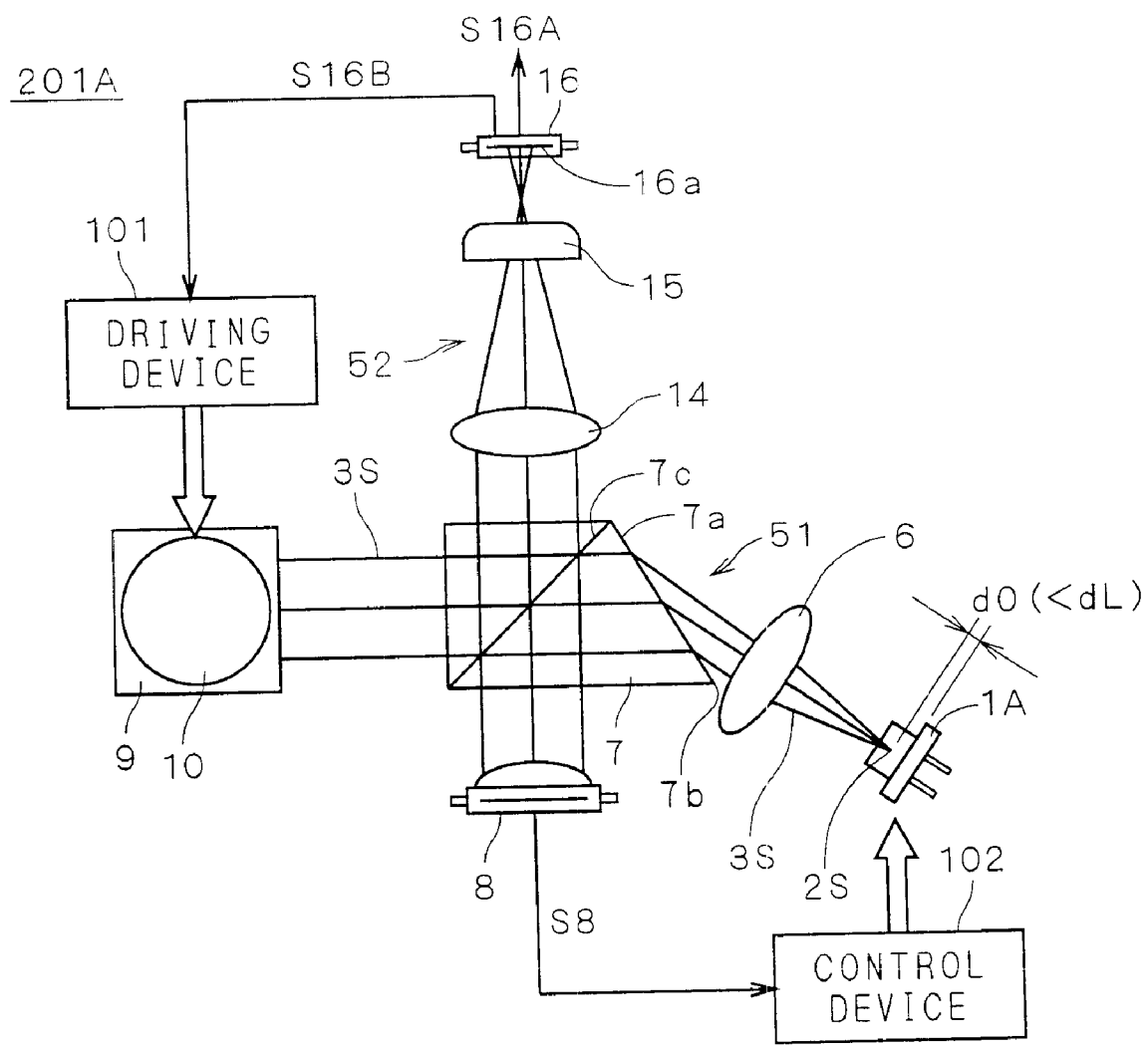

F I G . 10
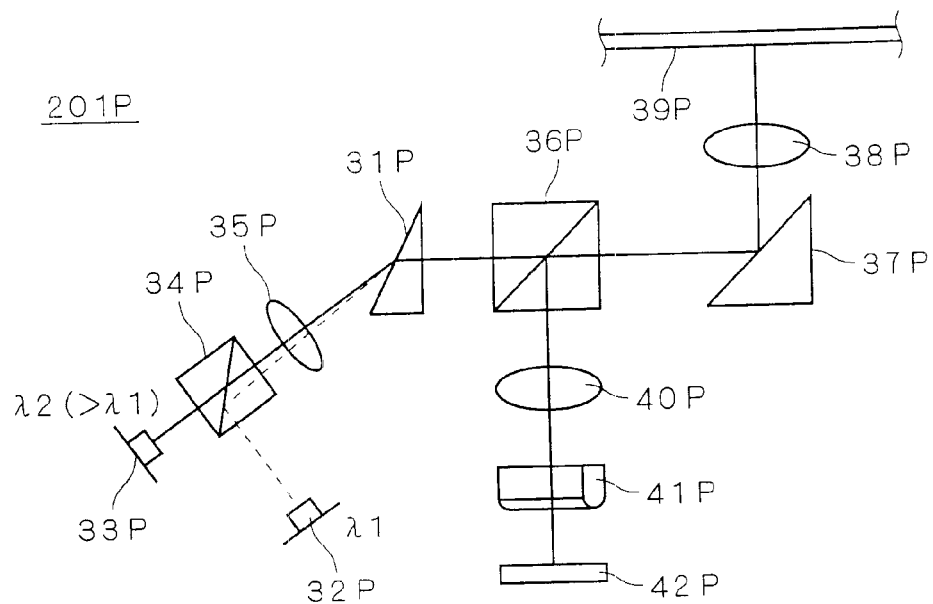
F I G . 11
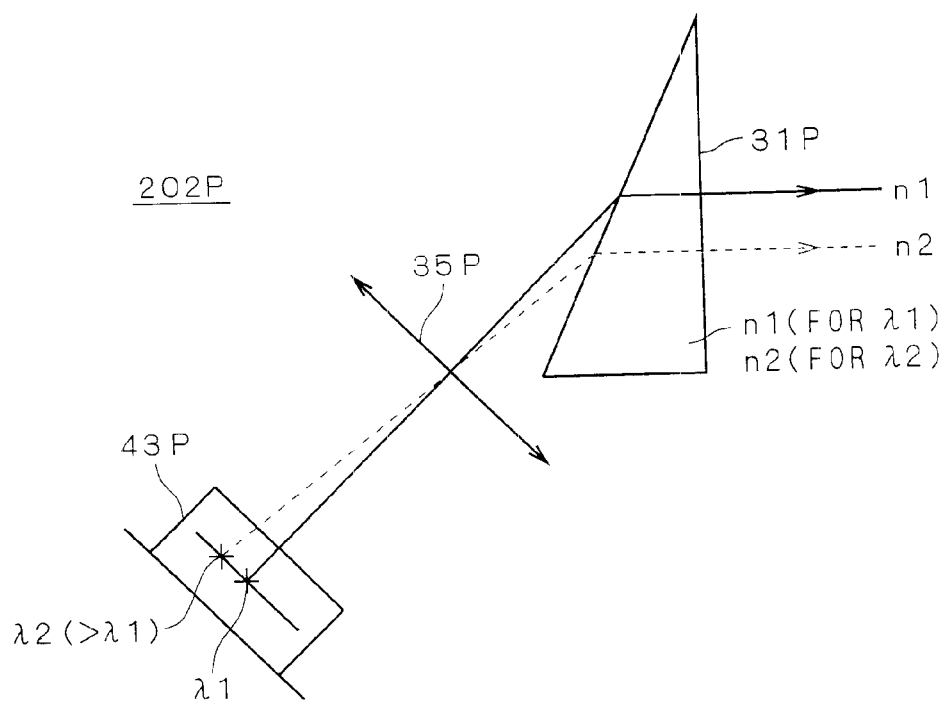

OPTICAL HEAD DEVICE

BACKGROUND OF THE INVENTION

1. Field of the Invention

The present invention relates to an optical head device for optically recording/reproducing information to and from an information recording medium (a so-called optical disk), and particularly to a technique for reducing unstableness of operation caused by a difference in wavelength between lights used in recording and reproduction.

2. Description of the Background Art

The characteristics such as reflectance of an information recording medium (a so-called optical disk) used to optically record/reproduce information have wavelength dependence. Accordingly it is necessary to record/reproduce information by using light at a given wavelength corresponding to the information recording medium. Optical head devices having light sources of different wavelengths are suggested, where the light emitted from each light source is applied to the information recording medium.

FIG. 10 is a schematic diagram showing the structure of a first conventional optical pickup device 201P. The optical pickup device 201P is disclosed in Japanese Patent Application Laid-Open No. 11-296893 (1999).

The optical pickup device 201P has a beam shaping prism (hereinafter referred to also as shaping prism) 31P, a light source 32P emitting light at a wavelength $\lambda 1$, a light source 33P emitting light at a wavelength $\lambda 2$ ($>\lambda 1$), a prism 34P, a collimator lens 35P, a beam splitter 36P, a deflection prism 37P, an objective lens 38P, an optical disk 39P, a condenser lens 40P, a cylindrical lens 41P and a photodetector 42P.

In the optical pickup device 201P, the light at the wavelength $\lambda 1$ emitted from the light source 32P and the light at the wavelength $\lambda 2$ emitted from the light source 33P are combined by the prism 34P and then sequentially enter the collimator lens 35P and the shaping prism 31P. The collimator lens 35P converts the lights into approximately parallel rays and the shaping prism 31P shapes their beam form.

The lights exit from the shaping prism 31P at about the same angles and their optical paths are deflected by 45 degrees by the deflection prism 37P. The lights are then focused by the objective lens 38P to form very small spots on the optical disk 39P. Information is recorded/reproduced to and from the optical disk 39P through the small spots.

The lights reflected at the optical disk 39P are converted again into approximately parallel rays by the objective lens 38P, reflected at the beam splitter 36P, and condensed by the condenser lens 40P. The cylindrical lens 41P introduces astigmatism to the lights and the lights are received at the photodetector 42P. The photodetector 42P outputs an information signal and a servo signal.

Next, FIG. 11 is a diagram schematically showing the structure of a second conventional optical pickup device 202P. The optical pickup device 202P is disclosed in the above-mentioned reference. The optical pickup device 202P has a light source unit 43P in place of the light sources 32P and 33P in the above-described optical pickup device 201P. The light source unit 43P has two light sources, or two semiconductor laser chips (hereinafter also referred to as LD chips) sealed in a single can. The two LD chips are spaced at an appropriate interval on the same plane which is vertical to the optical axis of the collimator lens 35P. The LD chips respectively emit light at a wavelength $\lambda 1$ and light at a wavelength $\lambda 2$. The lights emitted from the two LD chips are converted into approximately parallel rays by the collimator lens 35P and shaped by the shaping prism 31P. After passing through the shaping prism 31P, the lights travel the same optical path as that in the optical pickup device 201P.

The conventional optical pickup devices 201P and 202P have the following problems. First, the optical pickup device 201P has the two light sources 32P and 33P prepared as separate parts and disposed separately. Therefore the device has a larger number of parts and a complex structure, and must be large in size.

On the other hand, in the optical pickup device 202P, the two LD chips (light sources) are disposed in the single can and the lights at the two wavelengths are received at a single photodetector. Therefore it can solve the above-mentioned problem. However, the two LD chips are just arranged at an appropriate interval on the same plane which is vertical to the optical axis of the collimator lens 35P. Accordingly, the wavelength dependence of the refractive index in the optical axis direction of each optical part causes offset in a servo signal corresponding to at least one of the two lights of different wavelengths, which leads to another problem that the operation becomes unstable.

Furthermore, when two LD chips are separately prepared and simply arranged in a hybrid manner using an assembling machine, the relative position of the two LD chips depends on the mechanical accuracy of the assembling machine etc. That is to say, the positions of the two optical sources are likely to shift relative to each other. Such positional shift will cause offset in the servo signal and then the lights at the two wavelengths cannot be received accurately enough.

SUMMARY OF THE INVENTION (1) According to a first aspect of the present invention, an optical head device comprises: a light source comprising a first light emitting point for emitting a first light at a first wavelength and a second light emitting point for emitting a second light at a second wavelength in approximately the same direction as the first light, the first wavelength and the second wavelength differing from each other; a collimator lens disposed to face to the first light emitting point and the second light emitting point, for converting the first light and the second light into approximately parallel lights; and a beam shaping prism having a plane of incidence, the first light and the second light as the approximately parallel lights obliquely entering the plane of incidence, the beam shaping prism changing sectional intensity distributions of the first light and the second light to approximately circular shape; wherein the collimator lens and the beam shaping prism have refractive indexes dependent on a wavelength of incident light, and the first light emitting point and the second light emitting point are placed in different positions from each other in a direction parallel to and a direction vertical to an optical axis of the collimator lens.

(2) Preferably, according to a second aspect, in the optical head device, the first wavelength is shorter than the second wavelength and the refractive index of the collimator lens to the first wavelength is larger than the refractive index to the second wavelength, and wherein the first light emitting point is placed closer, than the second light emitting point, to the collimator lens.

(3) Preferably, according to a third aspect, in the optical head device, the first wavelength is shorter than the second wavelength and the refractive index of the beam shaping prism to the first wavelength is larger than the refractive index to the second wavelength, and wherein the first light enters the plane of incidence of the beam shaping prism at an angle of incidence which is larger than an angle of incidence at which the second light enters the plane of incidence.

(4) Preferably, according to a fourth aspect, in the optical head device, the first light emitting point and the second light emitting point are formed monolithically.

(5) Preferably, according to a fifth aspect, the optical head device further comprises a first optical system comprising the beam shaping prism, for directing the first light and the second light from the light source to a recording medium, a photodetector having a light receiving portion receiving the first light and the second light reflected at the recording medium, a sensor lens having a refractive index dependent on a wavelength of incident light, for converging the first light and the second light onto the light receiving portion, and a second optical system comprising the sensor lens, for directing the first light and the second light reflected at the recording medium to the photodetector.

(1) According to the first aspect of the invention, the first light emitting point and the second light emitting point are disposed in different positions in the direction parallel to the optical axis of the collimator lens and in the direction vertical to the optical axis of the collimator lens. It is then possible to cancel the wavelength dependence of the refractive indexes of various optical parts in the optical head device, including the collimator lens and the beam shaping prism, and to cancel the wavelength dependence of functions induced with refractive indexes, by adjusting the positions of the first light emitting point and the second light emitting point. Further, the wavelength dependence can be canceled at once both in the direction parallel to and the direction vertical to the optical axis in the optical head device. Accordingly, in an optical head device using a common optical system for the first light and the second light at different wavelengths, operations to both of the first light and the second light can be performed accurately and stably.

Furthermore, since the first light and the second light are emitted in approximately the same direction, the light source can be constructed as a single part or element. The optical head device can thus be constructed with a smaller number of parts and can be simpler in structure, as compared with a device having the first light emitting point and the second light emitting point as separate light sources. Moreover, the optical head device can be downsized.

(2) According to the second aspect, in the direction parallel to the optical axis of the collimator lens, it is possible to cancel the wavelength dependence of functions which the collimator lens etc. exert on the first light and the second light. Accordingly, by using the collimator lens in combination with a sensor lens whose refractive index to the first wavelength is larger than that to the second wavelength and which converts parallel light into converging light, the first light and the second light as parallel rays can be focused or converged onto the same position in the direction parallel to the optical axis of the sensor lens. This alleviates the problem caused if the first light and the second light are focused or converged in different positions, thus allowing the optical head device to accurately and stably operate.

(3) According to the third aspect, on the basis of the wavelength dependence of the refractive index of the beam shaping prism and the incidence angles of the first light and the second light to the beam shaping prism, it is possible to cause the first light and the second light to exit from the plane of incidence of the beam shaping prism at the same exit angle. That is to say, it is possible to cause the first light and the second light to become parallel to each other after they have passed through the plane of incidence of the beam shaping prism. This alleviates the problem caused if the first light and the second light are not parallel to each other, thus enabling the optical head device to operate accurately and stably. The incidence angles can be set as above by adjusting the positions of the first light emitting point and the second light emitting point in the direction vertical to the optical axis of the collimator lens.

(4) According to the fourth aspect, the first light emitting point and the second light emitting point are formed monolithically or as a single part. Therefore, the first light emitting point and the second light emitting point can be more precisely disposed than in a device where two light emitting points are separately prepared and simply arranged in a hybrid manner. Therefore the optical head device can operate more accurately and more stably.

(5) According to the fifth aspect, the wavelength dependence of the refractive indexes of the collimator lens, beam shaping prism and sensor leans, and the wavelength dependence of functions induced with refractive indexes, can be canceled by adjusting the positions of the first light emitting point and the second light emitting point. Accordingly the first light and the second light can both be focused or converged as spots in the same position on the light receiving portion of the photodetector, which reduces the offset of the operation or output signal of the photodetector which would be caused by the difference between the first wavelength and the second wavelength. As a result, the optical head device can operate accurately and stably.

The present invention has been made from the above-described viewpoints, and an object of the present invention is to provide an optical head device having simple structure and capable of reducing unstableness of operation caused by a difference in light wavelength.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are schematic diagrams showing the structure of an optical head device according to a first preferred embodiment.

FIG. 6 is a diagram showing an optical characteristic of the beam shaping prism of the optical head device of the first preferred embodiment.

FIGS. 7 and 8 are schematic diagrams showing an optical head device for comparison used to explain the optical head device of the first preferred embodiment.

FIG. 10 is a schematic diagram showing the structure of a first conventional optical pickup device.

FIG. 11 is a schematic diagram showing the structure of a second conventional optical pickup device.

DESCRIPTION OF THE PREFERRED EMBODIMENTS

<First Preferred Embodiment>

A. Whole Structure of Optical Head Device 201

Figure 1:
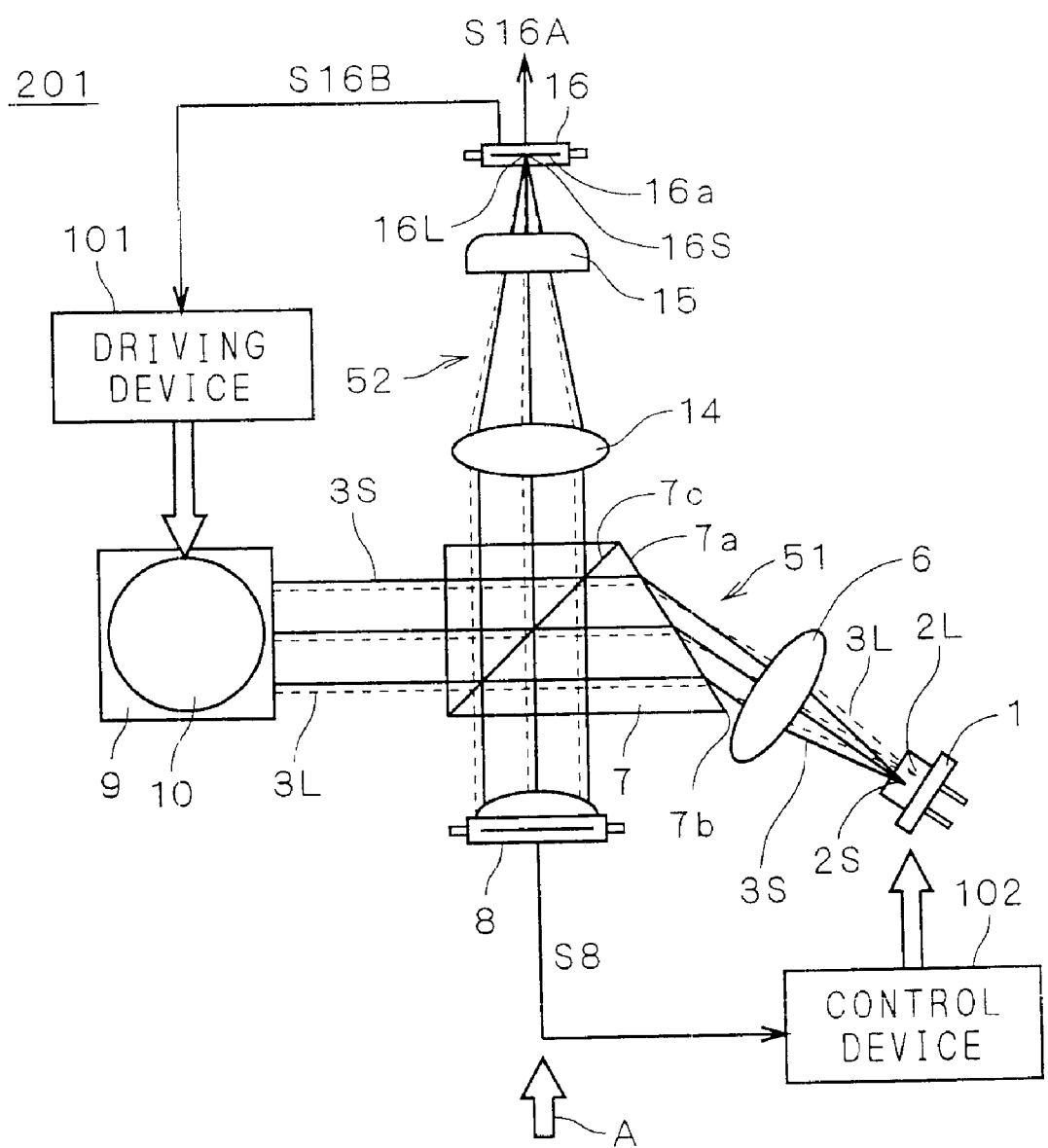

FIGS. 1 and 2 are diagrams schematically showing the structure of an optical head device 201 according to a first preferred embodiment. FIG. 2 is a diagram showing the optical head device 201 seen in the direction of the arrow A in FIG. 1. For convenience, FIG. 2 also shows a recording medium (the so-called optical disk) 11 which can optically record information.

The optical head device 201 has a light source 1, a collimator lens 6, a beam shaping prism (hereinafter also referred to as shaping prism) 7, a reflecting mirror 9, an objective lens 10, a sensor lens 14, a cylindrical lens 15, a sensing photodetector 16 (hereinafter also referred to as photodetector 16), a monitoring photodetector 8 (hereinafter also referred to as photodetector 8), a driving device 101 for driving the objective lens 10, and a control device 102 for controlling the light source 1.

More specifically, the light source 1 is a single part or element having a light emitting point (a first light emitting point) 2S which emits a light (a first light) 3S at a wavelength (a first wavelength) $\lambda S$ and a light emitting point (a second light emitting point) 2L which emits a light (a second light) 3L at a wavelength (a second wavelength) $\lambda L$. Particularly, (wavelength $\lambda S$)<(wavelength $\lambda L$), and the (wavelength $\lambda S$)=630 to 650 nm and the (wavelength $\lambda L$)= 780 nm in this example. For instance, the two light emitting points 2S and 2L are each composed of a semiconductor laser; they are formed monolithically, in other words, they are integrally formed as a single part or element. The two light emitting points 2S and 2L are arranged so that the two lights 3S and 3L are emitted in approximately the same direction. The light source 1 is controlled by the control device 102 to emit the light 3S and/or the light 3L. The optical head device 201 uses a common optical system, which will be described later, for the lights 3S and 3L having different wavelengths. The light source 1 will be described in greater detail later.

The collimator lens 6 is arranged to face to the light emitting points 2S and 2L. The collimator lens 6 converts the lights 3S and 3L as diverging rays into approximately parallel rays.

The shaping prism 7 has an inclined plane (a plane of incidence) 7a. The light source 1, shaping prism 7 etc. are arranged so that the lights 3S and 3L transmitted through the collimator lens 6 obliquely enter the inclined plane 7a. The shaping prism 7 shapes the lights 3S and 3L at the inclined plane 7a so that their sectional intensity distributions become closer to circular shape from elliptical shape. The shaping prism 7 is made of BSC7 (BK7) which is a glass material used in common prisms etc. The collimator lens 6, sensor lens 14, and cylindrical lens 15, too, are made of BSC7 (BK7).

The shaping prism 7 has an inclined plane 7c which functions as a beam splitter. The lights 3S and 3L which have passed through and shaped at the inclined plane 7a impinge on the inclined plane 7c and are divided into a reflected light and a transmitted light. The shaping prism 7 has an acute-angled edge 7b at the end portion of the inclined plane 7a on the side closer to the collimator lens 6.

The lights 3S and 3L reflected at the inclined plane 7c enter the monitoring photodetector 8. The photodetector 8 sends a signal S8 corresponding to the quantity of light of the received lights 3S and 3L to the control device 102. The control device 102 feedback-controls the quantity of light of the lights 3S and 3L emitted from the light source 1 on the basis of the received signal S8.

On the other hand, the lights 3S and 3L transmitted through the inclined plane 7c are reflected at the reflecting mirror 9 and directed to the objective lens 10. The objective lens 10 focuses the lights 3S and 3L onto the recording medium 11 (the recording surface 11a thereof) to form focused spots 11S and 11L.

The optical system (a first optical system) 51 including the collimator lens 6, shaping prism 7, reflecting mirror 9 and objective lens 10 thus leads the lights 3S and 3L emitted from the light source 1 to the recording medium 11.

Subsequently, the lights 3S and 3L are reflected at the recording medium 11 and are led to the sensing photodetector 16 as shown below through the optical system (a second optical system) 52 including the objective lens 10, reflecting mirror 9, shaping prism 7, sensor lens 14 and cylindrical lens 15.

More specifically, the lights 3S and 3L reflected at the recording medium 11 enter the shaping prism 7 through the objective lens 10 and the reflecting mirror 9 and are reflected at the inclined plane 7c of the shaping prism 7 to the sensor lens 14. The sensor lens 14 converts the lights 3S and 3L from parallel rays into converging rays, which then enter the cylindrical lens 15. The cylindrical lens 15 introduces astigmatism to the lights 3S and 3L. This astigmatism is used to obtain the signal of focusing error about the focused stops 11S and 11L relative to the recording medium 11.

Figure 3:
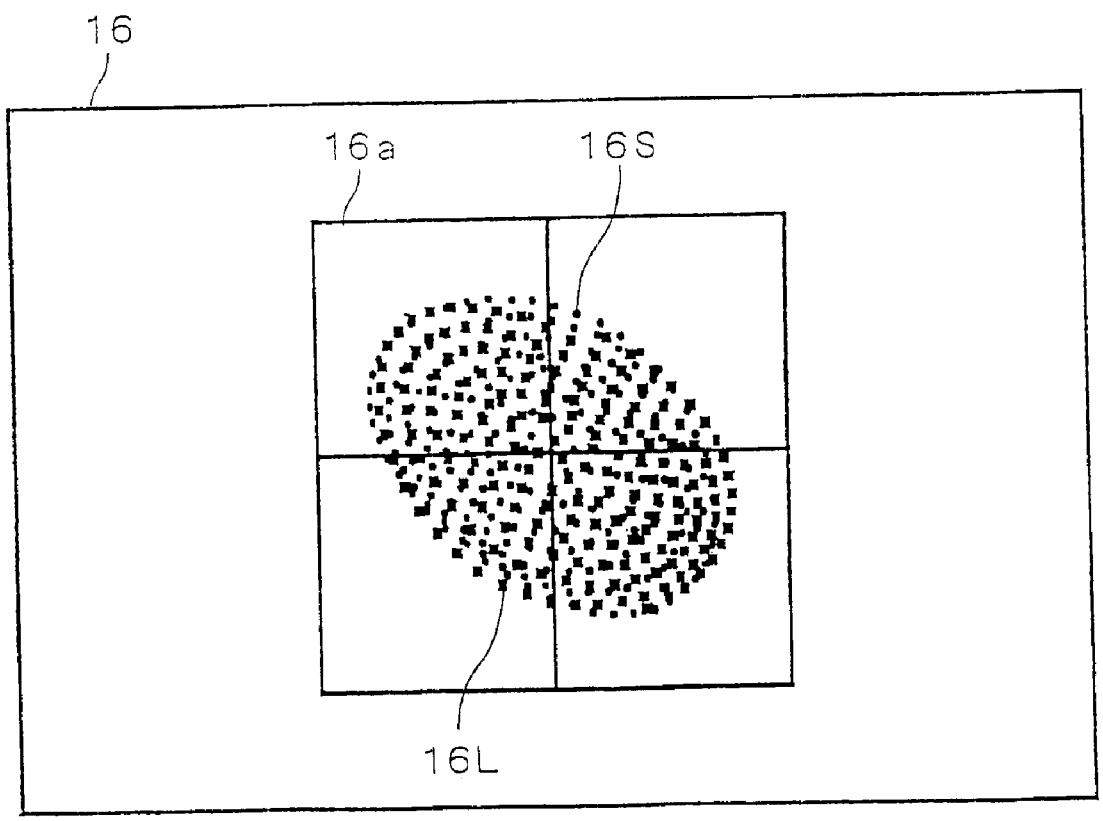
FIG. 3 is a schematic diagram used to explain focused or converged spots on the sensing photodetector in the optical head device of the first preferred embodiment.

After passing through the cylindrical lens 15, the lights 3S and 3L form focused or converged spots 16S and 16L on the light receiving portion or light receiving surface 16a of the photodetector 16. FIG. 3 is a schematic diagram (calculated values) used to explain the focused spots 16S and 16L on the light receiving portion 16a of the photodetector 16. In FIG. 3, the focused spot 16S is shown with ● and the focused spot 16L is shown with ■, where the focused stops 16S and 16L are shown at the same time for convenience. As shown in FIG. 3, in the optical head device 201, the two focused spots 16S and 16L are both formed in the center on the light receiving portion 16a (hence in the same position) with the same size. The light receiving portion 16a has a size of about 300 $\mu$m and the size (shorter diameter) of the focused stops 16S and 16L is set to about 100 $\mu$m from the viewpoints of sensor signal amplitude, reliability, etc.

On the basis of the received lights 3S and 3L, the photodetector 16 outputs signals including reproduction signal S16A and signal S16B about focusing error and tracking error of the focused spots 11S and 11L relative to the recording medium 11. The signal S16B is sent to the driving device 101 and the driving device 101 controls the position of the objective lens 10 with a servo signal based on the signal S16B to correct the positional error of the focused spots 11S and 11L.

B. Structure and Arrangement of the Light Source 1

Figure 4:
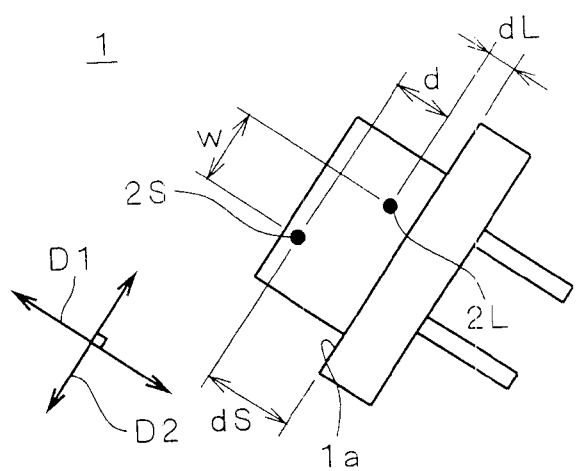
FIG. 4 is a schematic diagram showing the light source of the optical head device of the first preferred embodiment.

Next, the structure and arrangement of the light source 1 is described in detail. FIG. 4 is a schematic diagram showing the light source 1. As shown in FIG. 4, the light emitting points 2S and 2L are placed on the same side of the mounting reference plane (hereinafter also referred to as reference plane) which is vertical to the optical axis of the collimator lens 6, but they are placed in different positions. More specifically, while the light emitting point 2S is positioned at a distance or interval dS from-the reference plane 1a in the direction D1 parallel to the optical axis of the collimator lens 6 (the direction D1 is also referred to as first direction hereinafter), the light emitting point 2L is positioned at a distance or interval dL from the reference plane 1*a* in the first direction D1. Particularly, (distance dS)>(distance dL) and the light emitting point 2S is positioned closer, than the light emitting point 2L, to the collimator lens 6 in the first direction D1. Further, the two light emitting points 2S and 2L are spaced at a distance or interval d (=dS−dL) in the first direction D1.

Furthermore, the two light emitting points 2S and 2L are spaced at a distance or interval w in a second direction D2 vertical to the first direction D1, i.e. in the direction parallel to the reference surface 1*a*, and the acute-angled edge 7*b* of the shaping prism 7 is positioned on the side of the light emitting point 2S.

As described above, the two light emitting points 2S and 2L are formed monolithically (or formed integrally as a single part or a single-piece component), where the light emitting points 2S and 2L are arranged in the above relation by: (a) forming the two light emitting points 2S and 2L in (three-dimensionally) shifted positions in the component or (b) disposing the component at an angle with respect to the reference plane 1*a*, for example.

Figure 5:
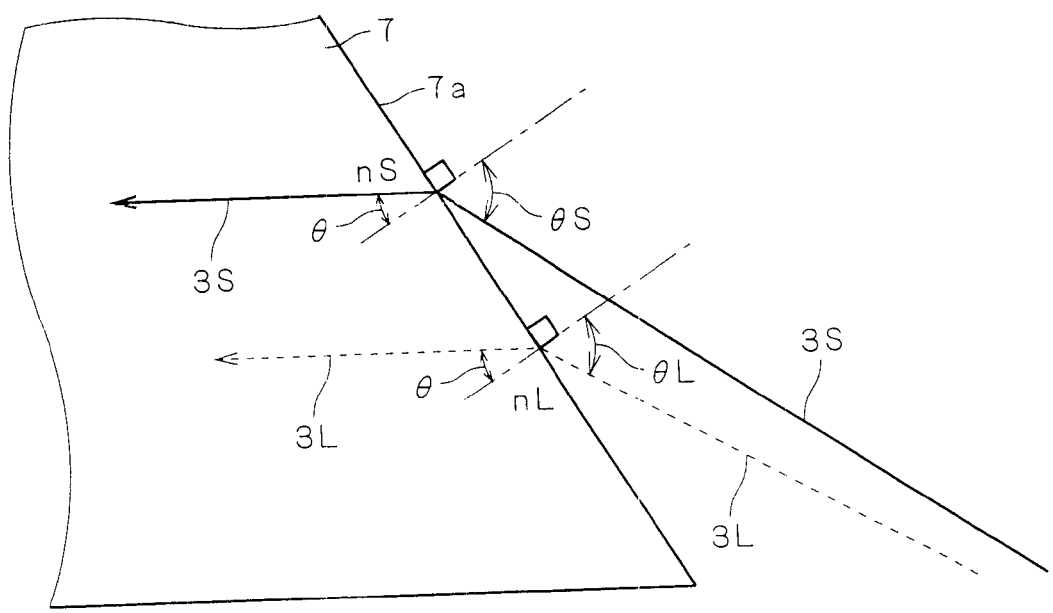
FIG. 5 is a schematic diagram used to explain incidence of lights to the beam shaping prism in the optical head device of the first preferred embodiment.

Next, FIG. 5 shows a schematic diagram for explaining the incidence of the lights 3S and 3L to the shaping prism 7. Since the two light emitting points 2S and 2L are arranged as described above, that is, since they are not arranged at the same point, the lights 3S and 3L which have passed through the collimator lens 6 and converted into parallel rays are not parallel to each other and they enter the inclined plane 7*a* of the shaping prism 7 at different angles. Particularly, in the optical head device 201, the light source 1, shaping prism 7 etc. are arranged so that the angle of incidence, θS, of the light 3S to the inclined plane 7*a* is larger than the angle of incidence, θL, of the light 3L (θS>θL). Furthermore, the incidence angles θS and θL are set so that the lights 3S and 3L exit from the inclined plane 7*a* at equal exit angles. This is explained in greater detail below.

FIG. 6 shows the wavelength dependence of the refractive index of the shaping prism 7. The horizontal axis shows the light wavelength and the vertical axis shows the refractive index. The characteristic values in FIG. 6 are based on "HOYA OPTICAL GLASS TECHNICAL DATA." As shown in FIG. 6, the refractive index of the shaping prism 7, that is, the refractive index of BSC7 (BK7), becomes larger as the wavelength of incident light becomes shorter (the so-called negative gradient refractive index). Therefore, the refractive index nS to the light 3S at a shorter wavelength than the light 3L is larger than the refractive index nL to the light 3L (nS >nL), so that the light 3S is bent more largely than the light 3L.

Now, in the optical head device 201, the incidence angles θS and θL of the lights 3S and 3L to the inclined plane 7*a*, the exit angle θ and the refractive indexes nS and nL are set to satisfy the expressions below. As stated above, the exit angle θ is equal between the two lights 3S and 3L.

$(nL) \times (\sin(\theta)) = (\sin(\theta L))$ $(nS) \times (\sin(\theta)) = (\sin(\theta S))$ $(\sin(\theta L))/(nL) = (\sin(\theta S))/(nS)$ For example, when the wavelength θS is about 640 nm and the wavelength λL is about 780 nm, the following specific design values are obtained.

$nS=1.515$ $nL=1.511$ $\theta S=70.00 \text{ deg}$ $\theta L=69.59 \text{ deg}$ $\theta=38.34 \text{ deg}$ In this case, when the collimator lens 6 has a focal length of 11 mm, for example, the distance w between the two light emitting points 2S and 2L in the second direction D2 (see FIG. 4) is obtained as about 80 μm from the following equation.

$W=(\theta S-\theta L) \times (\pi)/(180 \times 11)=0.0787 \text{ mm}$

Thus arranging the light emitting points 2S and 2L in different positions in the first direction D1 and the second direction D2 produces the following functions and effects.

First, as stated above, the light emitting points 2S and 2L are spaced at an interval d (=dS−dL) in the first direction D1. In a common optical head device, the focal length fC of the collimator lens and the focal length fS of the sensor lens are set in the relation fC<fS. Also, since the movement of the focus positions of the two lenses is proportional to the square of the focal length (the so-called longitudinal magnification), slightly varying the interval d between the light emitting points 2S and 2L in the optical head device 201 greatly varies the interval between the focused spots 16S and 16L on the light receiving portion 16*a*.

Figure 8:
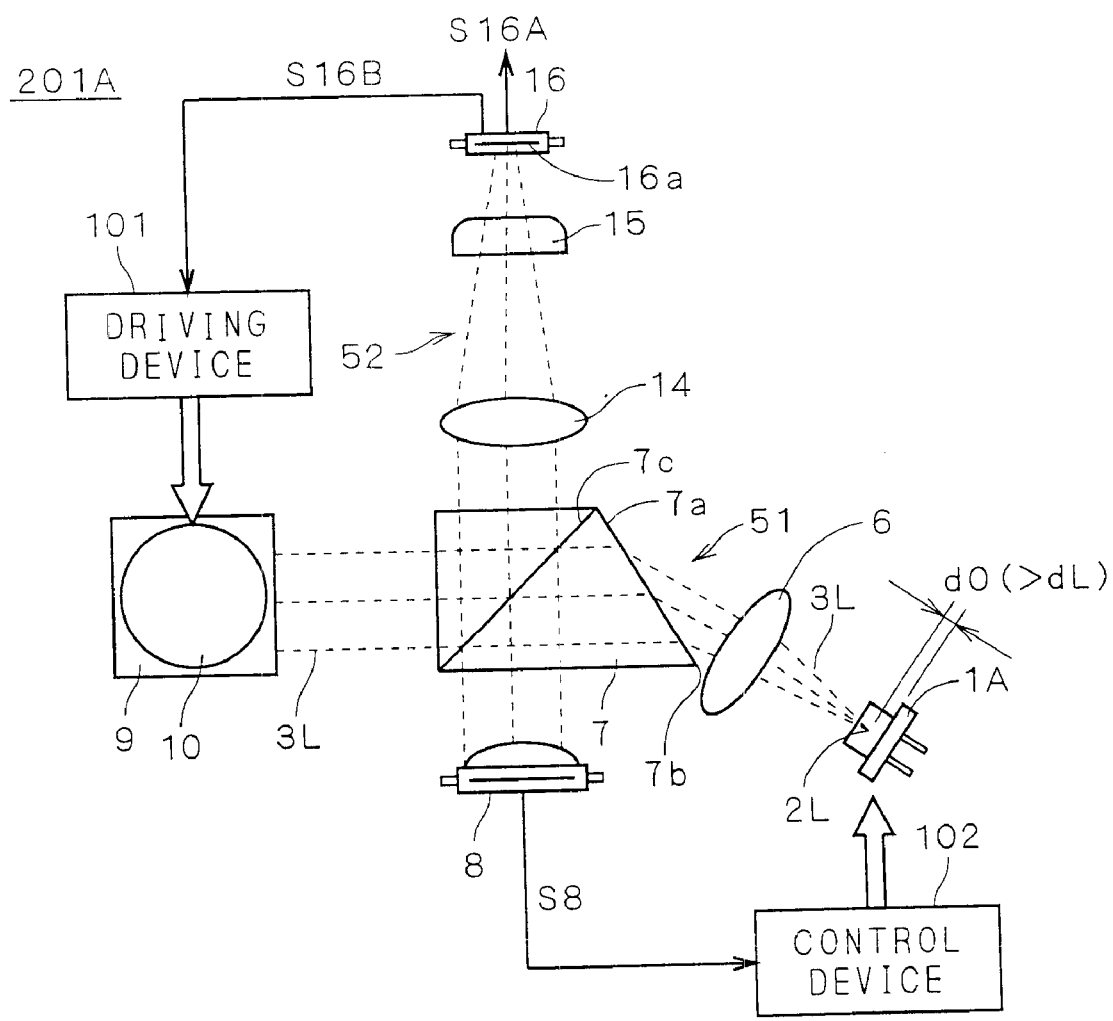

Now FIGS. 7 and 8 schematically show the structure of an optical head device 201A for comparison. In the optical head device 201A, the light source 1A has light emitting points 2S and 2L in the same position. More specifically, the light emitting points 2S and 2L are arranged on the optical axis of the collimator lens 6 and at a distance d0 from the reference plane 1*a* (see FIG. 4). It is assumed here that (distance dS)>(distance d0)>(distance dL). In other respects the optical head device 201A is constructed in the same way as the optical head device 201. FIGS. 7 and 8 show situations where the light source 1A emits the light 3S and the light 3L, respectively.

As already stated, the refractive indexes of the collimator lens 6 and the sensor lens 14 have wavelength dependence and therefore the collimator lens 6 and the sensor lens 14 have wavelength dependence in the focusing or converging function. Accordingly, in the optical head device 201A, in correspondence with the relation (distance dS)>(distance d0)>(distance dL), the light 3S transmitted through the sensor lens 14 is focused ahead of the light receiving portion 16*a* (see FIG.7) and the light 3L transmitted through the sensor lens 14 is focused behind the light receiving portion 16*a* (see FIG. 8). That is to say, in the optical head device 201A, the spots 16S and 16L cannot be simultaneously formed on the light receiving portion 16*a*.

Figure 9:
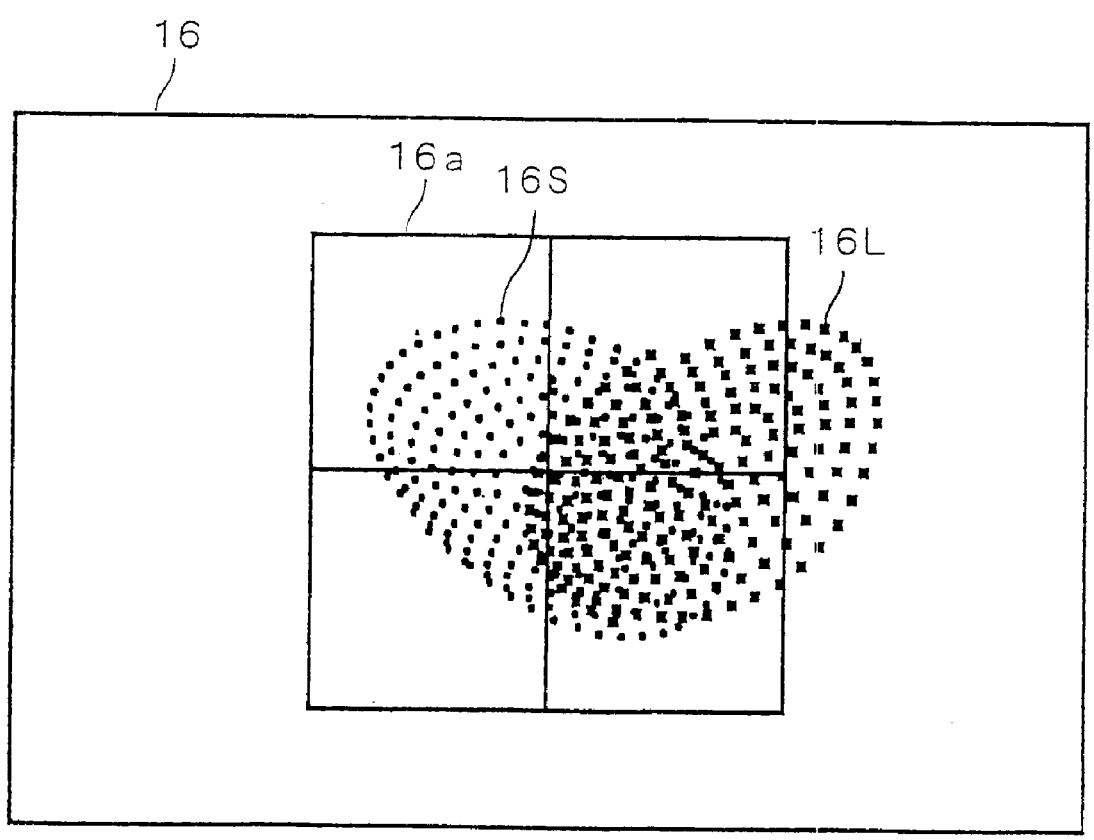
FIG. 9 is a schematic diagram used to explain focused spots on the sensing photodetector in the optical head device for comparison.

Next, FIG. 9 is a schematic diagram (calculated values) used to explain the focused spots 16S and 16L in the optical head device 201A. For convenience of description, FIG.9 shows the two focused spots 16S and 16L at the same time. Since the two light emitting points 2S and 2L are arranged in the same position in the optical head device 201A as stated above, the lights 3S and 3L enter the inclined plane 7*a* of the shaping prism 7 at the same angle of incidence. Therefore, because of the wavelength dependence of the refractive index of the shaping prism 7, the lights 3S and 3L exit from the inclined plane 7*a* at different angles and, as shown in FIG. 9, the focused spots 16S and 16L are not formed in the same position on the receiving portion 16*a*.

Accordingly, in the optical head device 201A having the two light emitting points 2S and 2L in the same position, the signal S16B (see FIG. 1) corresponding to at least one of the lights 3S and 3L cannot be correctly obtained, which causes offset in the servo signal.

In contrast, the two light emitting points 2S and 2L in the optical head device 201 are arranged at an interval d in the first direction D1, so that the wavelength dependence of the focusing or converging function to the two lights 3S and 3L can be canceled by adjusting the interval d. Then the two spots 16S and 16L can both be focused or converged on the light receiving portion 16a and the focused spots 16S and 16L can be formed in the same size.

Furthermore, the angles of incidence θS and θL are set as stated above by spacing the two light emitting points 2S and 2L at the interval w in the second direction D2. This, in combination with the wavelength dependence of the refractive index of the shaping prism 7, enables the lights 3S and 3L to exit from the inclined plane 7a at the same exit angle θ. Hence, in the direction vertical to the optical axis of the optical head device 201, it is possible to cancel the wavelength dependence of the exit angles of the lights 3S and 3L leaving the inclined plane 7a, in other words, it is possible to cancel the wavelength dependence of the refractive index of the shaping prism 7, so that the lights 3S and 3L exit from the inclined plane 7a in parallel with each other. This allows the focused spots 16S and 16L to form in the same position on the light receiving portion 16a.

In this way, the optical head device 201 can simultaneously cancel the wavelength dependence both in the direction parallel to the optical axis in the device 201 and in the direction vertical to it. As a result the two focused spots 16S and 16L can be formed in the same position and with the same size on the light receiving portion 16a as shown in FIG. 3. Accordingly, as compared with the conventional optical pickup device 202P, the sensor offset to the two lights 3S and 3L, and hence offset of the servo signal, can be reduced so that operations to the lights 3S and 3L can both be accomplished accurately and stably.

Further, the two light emitting points 2S and 2L are formed monolithically (or formed integrally as a single part or element). Accordingly, the two light emitting points 2S and 2L can be arranged more accurately than in a device where two light emitting points are separately prepared and simply arranged in a hybrid manner using an assembling machine. The above-described functions and effects can then be sufficiently produced by the arrangement of the light emitting points 2S and 2L to enable the optical head device to more accurately and stably operate.

Moreover, since the light source 1 is composed of a single part having the two light emitting points 2S and 2L, the number of parts can be reduced and the structure can be simplified as compared with the conventional optical pickup device 201P. Furthermore, the device can be reduced in size.

<First Modification>

When, in contrast to those described above, the shaping prism 7, collimator lens 6, sensor lens 14 etc. are made of a material whose refractive index becomes larger as the wavelength of incident light becomes longer (material having the so-called positive gradient refractive index), the functions and effects of the optical head device 201 can be obtained by exchanging the positions of the light emitting points 2S and 2L.

<Second Modification>

The light source 1 may have three or more light emitting points. In such a case, the description above can be applied to arbitrary two of the three or more light emitting points.

While the invention has been described in detail, the foregoing description is in all aspects illustrative and not restrictive. It is understood that numerous other modifications and variations can be devised without departing from the scope of the invention.

What is claimed is:

1. An optical head device comprising:

a light source comprising a first light emitting point for emitting a first light at a first wavelength and a second light emitting point for emitting a second light at a second wavelength in approximately the same direction as said first light, said first wavelength and said second wavelength differing from each other;

a collimator lens disposed to face to said first light emitting point and said second light emitting point, for converting said first light and said second light into approximately parallel lights; and a beam shaping prism having a plane of incidence, said first light and said second light as said approximately parallel lights obliquely entering said plane of incidence, said beam shaping prism changing sectional intensity distributions of said first light and said second light to approximately circular shape;

wherein said collimator lens and said beam shaping prism have refractive indexes dependent on a wavelength of incident light, and said first light emitting point and said second light emitting point are placed in different positions from each other in a direction parallel to and a direction vertical to an optical axis of said collimator lens.

2. The optical head device according to claim 1, wherein said first wavelength is shorter than said second wavelength, and said refractive index of said collimator lens to said first wavelength is larger than said refractive index to said second wavelength, and wherein said first light emitting point is placed closer, than said second light emitting point, to said collimator lens.

3. The optical head device according to claim 2, wherein said refractive index of said beam shaping prism to said first wavelength is larger than said refractive index to said second wavelength, and wherein said first light enters said plane of incidence of said beam shaping prism at an angle of incidence which is larger than an angle of incidence at which said second light enters said plane of incidence.

4. The optical head device according to claim 1, wherein said first wavelength is shorter than said second wavelength, and said refractive index of said beam shaping prism to said first wavelength is larger than said refractive index to said second wavelength, and wherein said first light enters said plane of incidence of said beam shaping prism at an angle of incidence which is larger than an angle of incidence at which said second light enters said plane of incidence.

5. The optical head device according to claim 1, wherein said first light emitting point and said second light emitting point are formed monolithically.

6. The optical head device according to claim 1, further comprising a first optical system comprising said beam shaping prism, for directing said first light and said second light from said light source to a recording medium, a photodetector having a light receiving portion receiving said first light and said second light reflected at said recording medium, a sensor lens having a refractive index dependent on a wavelength of incident light, for converging said first light and said second light onto said light receiving portion, and a second optical system comprising said sensor lens, for directing said first light and said second light reflected at said recording medium to said photodetector.

* * * * *